(12) United States Patent
Sato et al.

(10) Patent No.: US 10,684,639 B2
(45) Date of Patent: Jun. 16, 2020

(54) OPERATION DEVICE

(71) Applicant: Alps Alpine Co., Ltd., Tokyo (JP)

(72) Inventors: Kunio Sato, Miyagi-ken (JP); Shun Miyazaki, Miyagi-ken (JP); Yasuji Hagiwara, Miyagi-ken (JP); Keigo Wakana, Miyagi-ken (JP); Shoji Sakurai, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 656 days.

(21) Appl. No.: 15/480,166

(22) Filed: Apr. 5, 2017

(65) Prior Publication Data

US 2017/0212548 A1 Jul. 27, 2017

Related U.S. Application Data

(63) Continuation of application No. PCT/JP2015/078287, filed on Oct. 6, 2015.

(30) Foreign Application Priority Data

Nov. 4, 2014 (JP) ................................ 2014-224741

(51) Int. Cl.
G06F 3/02 (2006.01)
A63F 13/28 (2014.01)
(Continued)

(52) U.S. Cl.
CPC ............. *G05G 5/03* (2013.01); *A63F 13/24* (2014.09); *A63F 13/28* (2014.09); *A63F 13/285* (2014.09);
(Continued)

(58) Field of Classification Search
None
See application file for complete search history.

(56) References Cited

U.S. PATENT DOCUMENTS 4,131,033 A * 12/1978 Wright ..................... G05G 1/02
200/316
4,608,526 A * 8/1986 Martin ...................... B25J 3/04
244/223

(Continued)

FOREIGN PATENT DOCUMENTS

JP H02-278078 11/1990
JP H07-24147 1/1995

(Continued)

OTHER PUBLICATIONS

International Search Report dated Jan. 12, 2016 from International Application No. PCT/JP2015/078287.

*Primary Examiner* — William Kelleher
*Assistant Examiner* — Gregory T Prather
(74) *Attorney, Agent, or Firm* — Beyer Law Group LLP

(57) ABSTRACT

A movement member which reciprocates includes a thick portion and a thin portion, a bearing portion formed in the thick portion is slidingly supported by the guide shaft, and a sliding portion formed in the thin portion is slidingly guided by the sliding guide portion. Power of the motor is transmitted to a pinion gear via a speed reduction gear and a speed reduction mechanism inside a gear box, and a movement reaction force is applied from the pinion gear to the rack portion. Since the rack portion is positioned on an axis Os, a force is effectively applied to the movement member by the power from the motor.

8 Claims, 9 Drawing Sheets

(51) Int. Cl.
    *G05G 5/03*      (2008.04)
    *G06F 3/0362*    (2013.01)
    *G06F 3/01*      (2006.01)
    *A63F 13/24*     (2014.01)
    *A63F 13/285*    (2014.01)
    *F16H 19/04*     (2006.01)
    *H02K 7/06*      (2006.01)
    *H02K 7/116*     (2006.01)
    *H02K 11/21*     (2016.01)
    *G05G 1/02*      (2006.01)

(52) U.S. Cl.
    CPC .............. *F16H 19/04* (2013.01); *G06F 3/016* (2013.01); *G06F 3/0202* (2013.01); *G06F 3/0362* (2013.01); *H02K 7/06* (2013.01); *H02K 7/116* (2013.01); *H02K 11/21* (2016.01); *G05G 1/02* (2013.01)

(56) References Cited

U.S. PATENT DOCUMENTS

| | | | | |
|---|---|---|---|---|
| 4,724,715 | A * | 2/1988 | Culver | G05G 9/02 345/157 |
| 5,317,336 | A * | 5/1994 | Hall | G06F 3/039 248/918 |
| 5,652,603 | A * | 7/1997 | Abrams | G06F 3/016 33/516 |
| 5,823,876 | A * | 10/1998 | Unbehand | A63F 13/06 463/37 |
| 5,990,869 | A * | 11/1999 | Kubica | G06F 3/016 33/1 M |
| 6,154,201 | A * | 11/2000 | Levin | G01C 21/3664 345/156 |
| 7,753,786 | B2 * | 7/2010 | Ishimaru | A63F 13/06 463/36 |
| RE42,183 | E * | 3/2011 | Culver | G06F 3/0362 345/157 |
| 8,545,323 | B2 * | 10/2013 | McVicar | A63F 13/06 463/38 |
| 8,610,548 | B1 * | 12/2013 | Provancher | H04B 3/36 340/407.1 |
| 9,504,914 | B2 * | 11/2016 | Grant | A63F 13/06 |
| 9,557,830 | B2 * | 1/2017 | Grant | G06F 3/0338 |
| 2004/0040805 | A1 * | 3/2004 | Bailey | G01B 5/008 188/267.2 |
| 2004/0164960 | A1 * | 8/2004 | Jacobus | B25J 9/1689 345/161 |
| 2004/0235571 | A1 | 12/2004 | Kobayashi | |
| 2006/0012584 | A1 * | 1/2006 | Vassallo | G06F 3/016 345/184 |
| 2007/0152988 | A1 * | 7/2007 | Levin | G06F 3/016 345/184 |
| 2007/0184909 | A1 * | 8/2007 | Kitami | A63F 13/06 463/51 |
| 2009/0079712 | A1 * | 3/2009 | Levin | G05G 9/047 345/184 |
| 2010/0108408 | A1 * | 5/2010 | Colgate | G06F 3/016 178/18.03 |
| 2011/0310066 | A1 * | 12/2011 | Fermgard | B43K 8/00 345/179 |
| 2012/0080294 | A1 * | 4/2012 | Ishikawa | G05G 1/02 200/4 |
| 2014/0160044 | A1 * | 6/2014 | Yairi | G06F 3/016 345/173 |
| 2014/0214206 | A1 * | 7/2014 | Steinberg | G06F 3/016 700/258 |
| 2015/0205352 | A1 * | 7/2015 | Grant | G06F 3/016 345/156 |
| 2015/0331525 | A1 * | 11/2015 | Yairi | F04B 43/113 345/173 |
| 2016/0026248 | A1 * | 1/2016 | Petrignani | G06F 3/011 345/156 |
| 2016/0030835 | A1 * | 2/2016 | Argiro | A63F 13/02 463/33 |
| 2016/0153508 | A1 * | 6/2016 | Battlogg | G05G 5/03 74/553 |
| 2016/0342211 | A1 * | 11/2016 | Yoest | G06F 3/016 |
| 2017/0177083 | A1 * | 6/2017 | Alghooneh | G06F 3/016 |
| 2017/0203208 | A1 * | 7/2017 | Sato | A63F 13/285 |
| 2017/0262080 | A1 * | 9/2017 | Armstrong | G06F 3/016 |
| 2018/0345135 | A1 * | 12/2018 | Schmitz | A63F 13/285 |
| 2018/0345136 | A1 * | 12/2018 | Schmitz | G06F 3/016 |
| 2018/0345137 | A1 * | 12/2018 | Schmitz | A63F 13/285 |
| 2019/0278370 | A1 * | 9/2019 | Rihn | A63F 13/285 |
| 2019/0302887 | A1 * | 10/2019 | Sinclair | G05G 5/03 |
| 2019/0339782 | A1 * | 11/2019 | Sato | G06F 3/0444 |
| 2019/0344170 | A1 * | 11/2019 | Schmitz | A63F 13/2145 |
| 2020/0023270 | A1 * | 1/2020 | Forest | A63F 13/285 |
| 2020/0086212 | A1 * | 3/2020 | Wong | A63F 13/245 |

FOREIGN PATENT DOCUMENTS

| | | |
|---|---|---|
| JP | 2000-202155 | 7/2000 |
| JP | 2001-190841 | 7/2001 |

* cited by examiner $Y_2 \longleftrightarrow Y_1$

OPERATION DEVICE

CLAIM OF PRIORITY

This application is a Continuation of International Application No. PCT/JP2015/078287 filed on Oct. 6, 2015, which claims benefit of Japanese Patent Application No. 2014-224741 filed on Nov. 4, 2014. The entire contents of each application noted above are hereby incorporated by reference.

BACKGROUND OF THE INVENTION

1. Field of the Invention

The present invention relates to an operation device which presses and operates an operation portion by hand, and particularly, to an operation device which can control a reaction force acting on an operation portion according to an operation position of the operation portion.

2. Description of the Related Art

An operation device to which a reaction force is applied when an operation portion is operated is widely used as a controller for a game device.

Japanese Unexamined Patent Application Publication No. 7-24147 discloses an invention relating to a gun unit used in a shooting game device as a controller for a game device. In the gun unit, a gun main body is attached to the upper portion of a support portion, and a vibration mechanism which reciprocatingly vibrates the entire gun main body forward and rearward is provided in the gun main body. If a trigger provided in the gun main body is pulled so as to be operated, the vibration mechanism starts, forward and rearward vibrations are applied to the entire gun main body, and a reaction is transmitted to a hand of an operator of a game.

Since the gun unit disclosed in Japanese Unexamined Patent Application Publication No. 7-24147 provides forward and rearward reciprocations with respect to the entire gun main body and does not directly give a reaction feeling to a finger operating the trigger, it is difficult to perform a realistic game operation. In addition, since the reaction force which is applied to the gun main body is limited to a vibration force due to a rotation of a motor, it is not possible to give various operation reaction forces to an operator.

In addition, if slight rattling is generated in the trigger, vibrations applied to the entire gun are not easily transmitted to the trigger, and it is difficult to realize a more realistic game operation.

SUMMARY OF THE INVENTION

The present invention to provide an operation device which can act a reaction force on a finger operating an operation portion and can apply various reaction forces according to an operation position of the operation portion.

In addition, the present invention is to provide an operation device which adopts a guide structure which decreases rattling of an operation portion to smoothen an operation and can cause an operator to feel that a reaction force directly acts on the operation portion.

According to an aspect of the present invention, there is provided an operation device including: a chassis; a movement member which is supported by the chassis; an operation portion configured to apply a movement force to the movement member; a motor configured to apply a force to the movement member; a position detection unit configured to detect a position of the movement member; and a control device configured to control an output of the motor according to a detection signal from the position detection unit, in which a guide shaft and a sliding guide portion are provided to be parallel to each other in the chassis, a bearing portion and a sliding portion are provided in the movement member, the guide shaft is inserted into the bearing portion, the sliding portion slides on the sliding guide portion, and the movement member is supported to be reciprocatingly movable in an axial direction of the guide shaft.

In the operation device of the present invention, since a reaction force is applied from the motor to the movement member, it is possible to cause a hand or a finger operating the movement member to directly feel an operation reaction force. In addition, since the movement position of the movement member is detected and various forces can be applied to the movement member, it is possible to apply various operation feelings to the operation portion.

In addition, since the guide shaft is provided in the chassis and the bearing portion of the movement member reciprocates along the guide shaft, it is possible to easily prevent rattling during the movement of the movement member, and it is possible to smoothly perform pressing with respect to the operation portion. In addition, an operation reaction force easily acts on a hand or a finger operating the operation portion directly.

In the operation device, preferably, a pinion gear which is rotationally driven by the motor is provided, and a rack portion which engages with the pinion gear is formed in the movement member, and when a direction in which an axis of the guide shaft and a guide center line of the sliding guide portion face each other is defined as a horizontal direction and a direction orthogonal to the horizontal direction is defined as a vertical direction, the rack portion is positioned at a position overlapping the axis of the guide shaft in the vertical direction.

In this configuration, since an application line of a movement force acting on the rack portion can overlap the axis of the guide shaft, it is possible to cause the movement force to directly act on the movement member, it is possible to minimize unnecessary moment applied to the movement member due to the movement force, and it is possible to stably apply a reaction force from the motor to the movement member and the operation portion.

In the operation device of the present invention, preferably, a thick portion and a recessed portion formed on a side of the thick portion are provided in the movement member, and the bearing portion and the rack portion are formed in the thick portion.

In this operation device, a speed reduction mechanism which transmits power from the motor to the pinion gear may be provided, and the speed reduction mechanism may face the recessed portion of the movement member.

Moreover, the motor may be provided at a position facing the recessed portion of the movement member.

According to the above-described configurations, it is possible to configure a thin operation device.

In the operation device of the present invention, preferably, a tooth portion of the pinion gear and a tooth portion of the rack portion are helical teeth.

Since the pinion gear and the rack portion are configured such that helical teeth engage with each other, a force is smoothly transmitted to each other between the movement member and the pinion gear. Accordingly, it is possible to easily operate the operation portion, and it is possible to cause a reaction force to effectively act on the operation portion by the power of the motor.

In the operation device of the present invention, the chassis may be formed of a metal plate, a facing wall portion facing a movement direction of the movement member and a side wall portion extending to be parallel in the movement direction of the movement member are bent to form the chassis, the guide shaft is perpendicularly fixed to the facing wall portion, and the sliding guide portion is provided in the side wall portion.

In the structure, since the chassis is formed of a sheet metal material, it is possible to decrease a size and weight of the chassis. In addition, since the movement member moves forward and rearward with reference to the guide shaft, the facing wall portion to which the guide shaft is fixed and the side wall portion on which the sliding guide portion is formed are bent, and even if mutual dimension accuracy is slightly rough, it is possible to move the movement member forward and rearward with high accuracy without occurrence of rattling.

BRIEF DESCRIPTION OF THE DRAWINGS

FIG. 7A is a plan view, and FIG. 7B is a side view.

DESCRIPTION OF THE PREFERRED EMBODIMENTS

Figure 1:
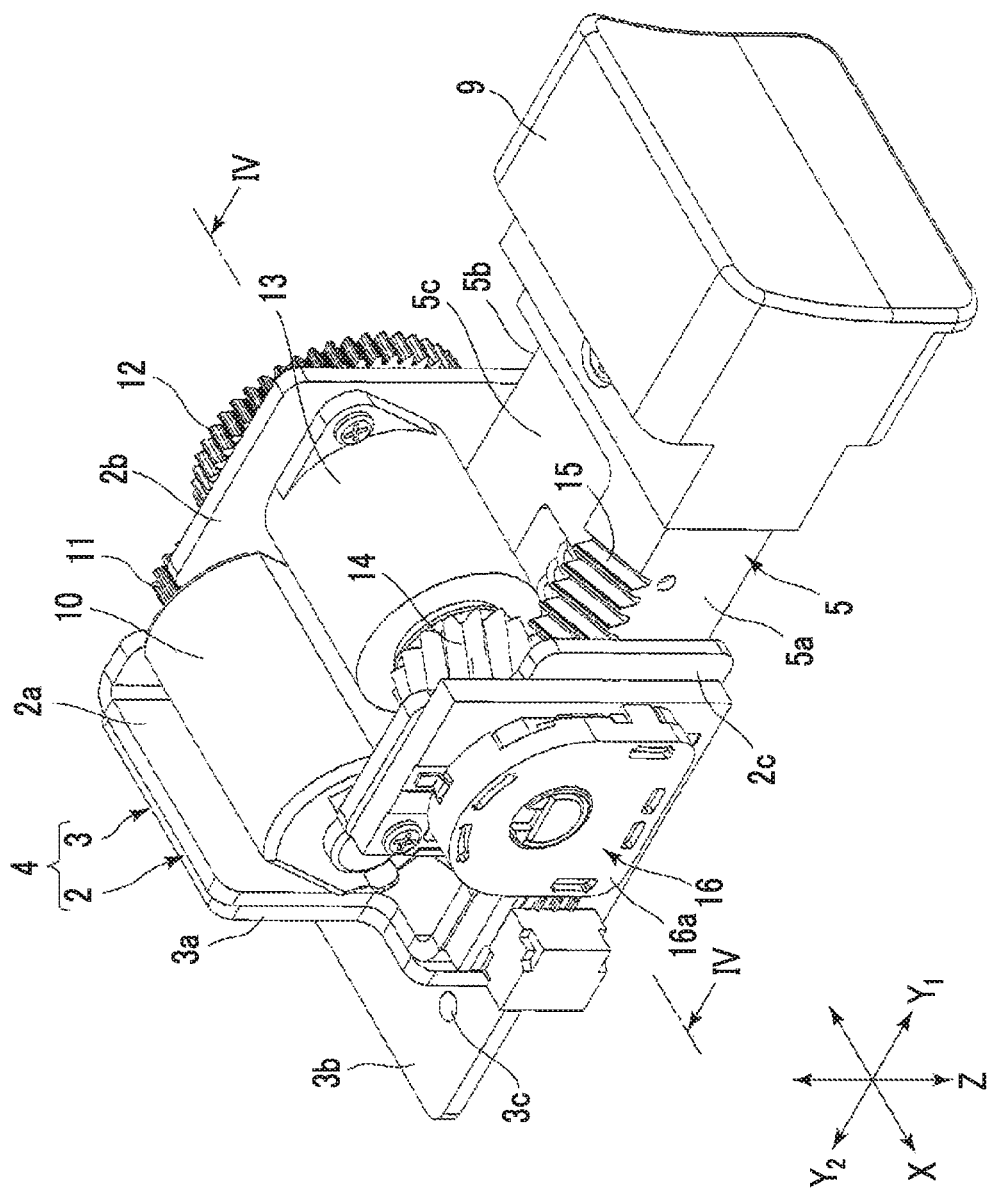
FIG. 1 is a perspective view showing the entire configuration of an operation device according to a first embodiment of the present invention and shows a state where a movement member and an operation portion move forward.

FIGS. 1 to 7 show an example in which an operation device according to an embodiment of the present invention is mounted on a gun-type controller for a shooting game. However, as described later, the operation device of the present invention can be mounted on various controllers other than the gun-type controller and various devices applied to those other than games.

In an operation device 1 shown FIGS. 1 to 4, an X direction is a horizontal direction, a Y direction is a forward-rearward direction, and a Z direction is a vertical direction. The operation device 1 includes a chassis 4. The chassis 4 is configured of a main body frame 2 and a bracket 3 for fixing the main body frame inside the gun-type controller. Both the main body frame 2 and the bracket 3 are formed of a sheet metal material.

The main body frame 2 includes a facing wall portion 2a, and a first side wall portion 2b and a second side wall portion 2c which are perpendicularly bent from both side portions of the facing wall portion 2a. The bracket 3 is formed by bending a fixation piece 3a and an attachment piece 3b to be perpendicular to each other. The facing wall portion 2a of the main body frame 2 and the fixation piece 3a of the bracket 3 are fixed to each other by spot welding or the like. An attachment hole 3c is formed in the attachment piece 3b, and the operation device 1 is fixed inside the gun-type controller by an attachment screw inserted into the attachment hole 3c.

A movement member 5 is provided inside the main body frame. The movement member 5 is formed of a synthetic resin material. In the movement member 5, a thick portion 5a and a thin portion 5b are integrally formed with each other, and a recessed portion 5c is formed on the upper portion of the thin portion 5b in the vertical direction. The thick portion 5a and the thin portion 5b are formed so as to be divided in the horizontal direction (X direction).

Figure 3:
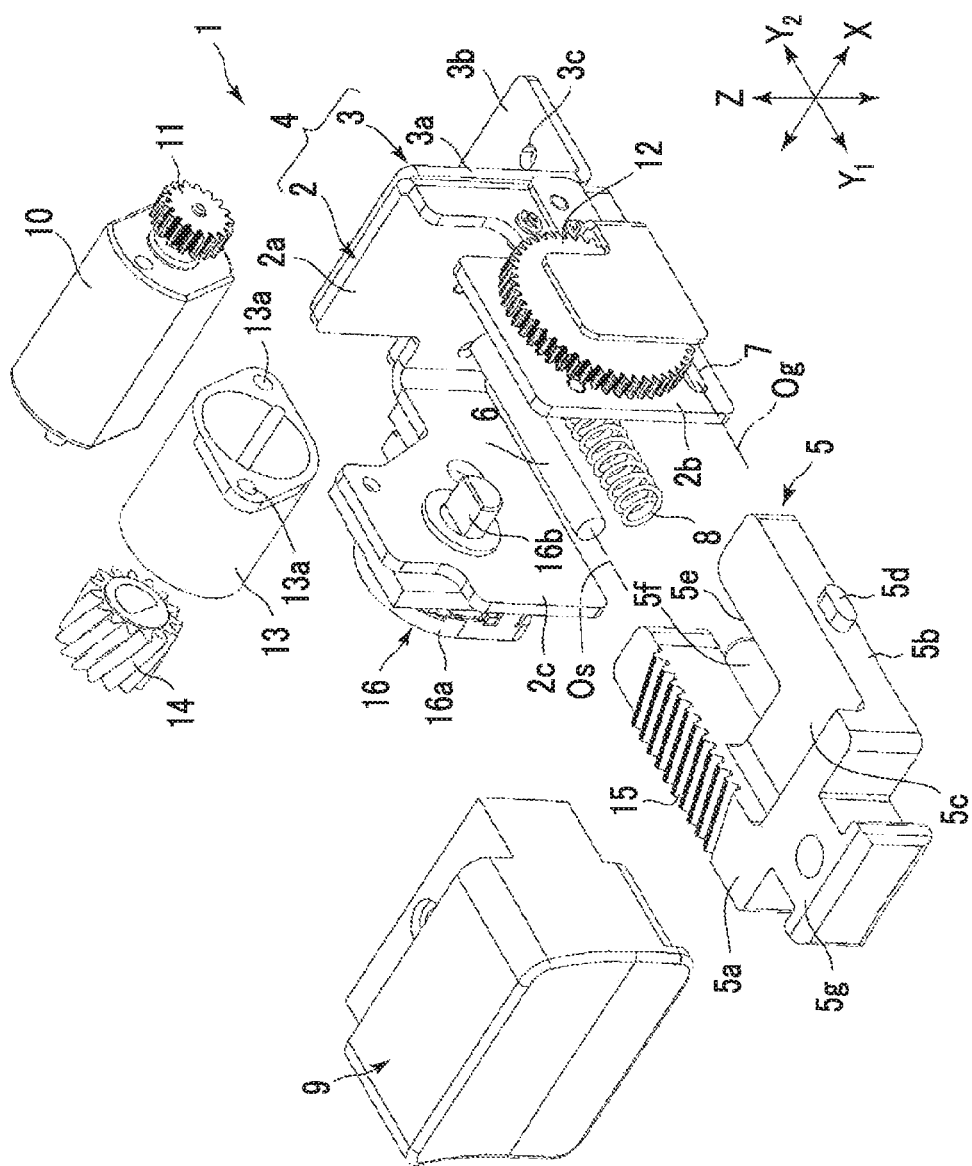
FIG. 3 is an exploded perspective view of the operation device according to the first embodiment of the present invention.
Figure 4:
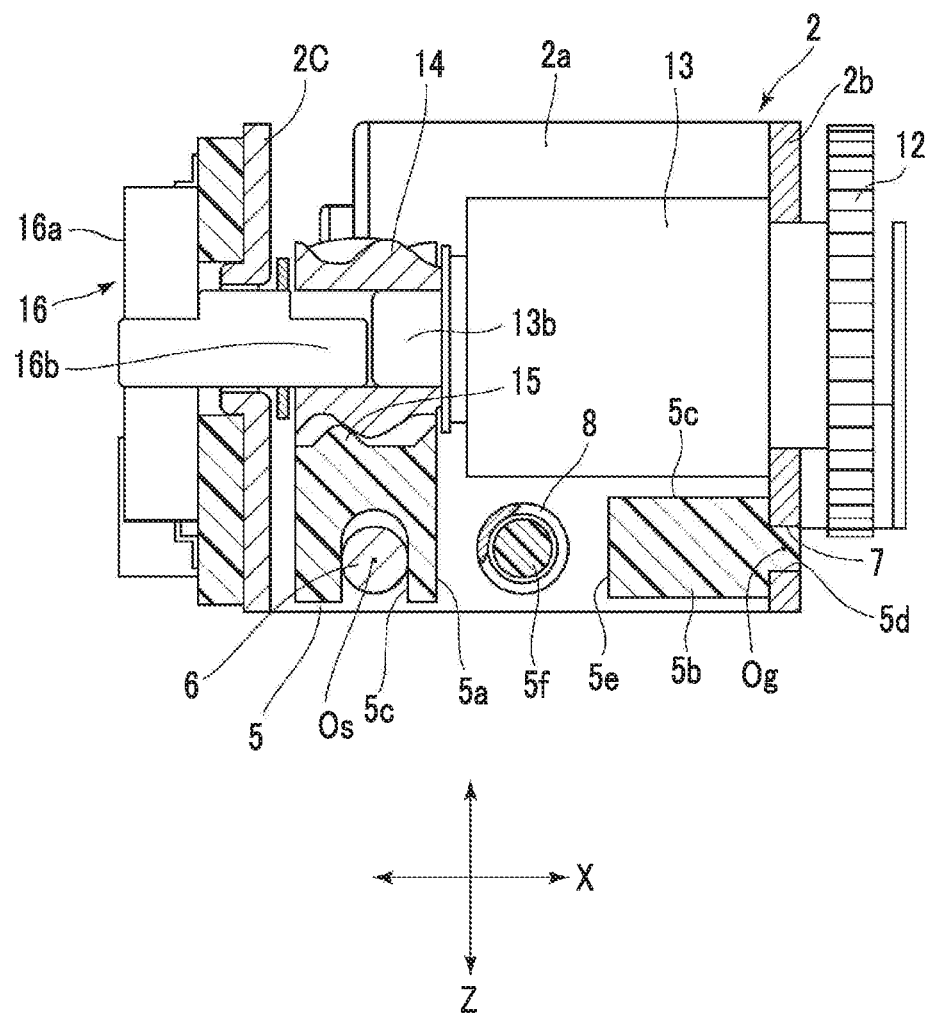
FIG. 4 is a sectional view taken along line IV-IV shown in FIG. 1 with respect to the operation device according to the first embodiment of the present invention.

As shown in FIG. 4, a bearing portion 5c is formed in the thick portion 5a of the movement member 5. The bearing portion 5c is a bearing groove which is open downward and is continuously formed in the forward-rearward direction (Y direction). As shown in FIGS. 3 and 4, a sliding portion 5d is integrally formed on the side end portion of the thin portion 5b. The center of the bearing portion 5c and the center of the sliding portion 5d are disposed at an interval in the horizontal direction (X direction). As shown in FIGS. 3 and 4, a recessed portion 5e which is open toward the rear side (Y2 direction) is formed between the thick portion 5a and the thin portion 5b, and a spring guide shaft 5f is integrally formed inside the recessed portion 5e. The spring guide shaft 5f linearly extends in the forward-rearward direction (Y direction).

As shown in FIG. 3, a guide shaft 6 is fixed to the facing wall portion 2a of the main body frame 2 which configures a portion of the chassis 4. The guide shaft 6 is formed of a metal, is perpendicularly attached to the facing wall portion 2a, and extends in the forward-rearward direction (Y direction). A sliding guide portion 7 is formed on the first side wall portion 2b of the main body frame 2. The sliding guide portion 7 is a long guide hole which linearly extends in the forward-rearward direction (Y direction). As shown in FIGS. 3 and 4, an axis Os of the guide shaft 6 and a guide center line Og of the sliding guide portion 7 face each other so as to be parallel to each other at an interval in the horizontal direction (X direction).

As shown in FIG. 4, the guide shaft 6 is inserted into the bearing portion 5c, the sliding portion 5d is slidingly inserted into the sliding guide portion 7, and the movement member 5 is supported so as to be movable in the forward-rearward direction (Y direction) inside the main body frame 2. The bearing portion 5c is slidingly inserted into the guide shaft 6 in the horizontal direction (X direction) with almost no gap and the movement member 5 can move in the forward-rearward direction with reference to the axis Os of the guide shaft 6. The sliding portion 5d is inserted into the sliding guide portion 7 in the vertical direction (Z direction) with almost no gap, and rattling in a rotation direction about the axis Os of the movement member 5 is restricted by fitting between the sliding portion 5d and the sliding guide portion 7.

A compression coil spring 8 is mounted on an outer periphery of the spring guide shaft 5f of the movement member 5. The compression coil spring 8 is interposed between the movement member 5 and the facing wall portion 2a in a state of being contracted. The movement member 5 is always biased forward (Y1 direction) by an elastic force of the compression coil spring 8.

A fitting portion 5g is formed on the end portion on the front side (Y1 side) of the movement member 5. The fitting portion 5g is a T-shaped fitting protrusion portion. An operation portion 9 is formed of a synthetic resin material and a fitting portion is formed on the rear end portion of the operation portion 9. The fitting portion is a fitting recessed portion. The fitting portion of the operation portion 9 is recession/protrusion fitted to the fitting portion 5g of the movement member 5 so as to be positioned, and the operation portion 9 and the movement member 5 are fixed to each other by a screw or the like. Since the operation portion 9 can be attached to and detached from the movement member 5, operation portion 9 can be selected so as to be attached according to a design of a controller on which the operation device 1 is mounted.

A motor 10 is disposed between the first side wall portion 2b and the second side wall portion 2c of the main body frame 2, and the motor 10 is fixed to the main body frame 2 by a screw. An output gear 11 is fixed to an output shaft of the motor 10. A speed reduction gear 12 is rotatably supported to the first side wall portion 2b of the main body frame 2, and if the motor 10 is fixed to the main body frame 2, the output gear 11 engages with the speed reduction gear 12.

A gear box 13 is disposed between the first side wall portion 2b and the second side wall portion 2c of the main body frame 2. Attachment holes 13a and 13a are formed in the gear box 13, attachment screws are inserted into the attachment holes 13a and 13a so as to be screwed to the first side wall portion 2b, and the gear box 13 is fixed to the first side wall portion 2b. A speed reduction mechanism is accommodated inside the gear box 13. As shown in FIG. 4, a speed reduction output shaft 13b protrudes from the gear box 13, and a rotation force of the speed reduction gear 12 is reduced by the speed reduction mechanism inside the gear box 13 and is transmitted to the speed reduction output shaft 13b. The speed reduction mechanism is configured of a sun gear, a planetary gear, or the like.

As shown in FIG. 4, a pinion gear 14 is fixed to the speed reduction output shaft 13b, and the rotation force of the motor 10 is reduced by the speed reduction gear 12 and the speed reduction mechanism inside the gear box 13 and is transmitted to the pinion gear 14. A rack portion 15 is formed on the upper surface of the thick portion 5a of the movement member 5 and the pinion gear 14 and the rack portion 15 engages with each other. Both a tooth portion of the pinion gear 14 and a tooth portion of the rack portion 15 are helical teeth.

In the movement member 5, the thick portion 5a is formed on a portion biased toward one side in the horizontal direction (X direction), and the bearing portion 5c and the rack portion 15 are formed in the thick portion 5a. Accordingly, portions other than the thick portion 5a can be configured to be thin. As shown in FIG. 4, the rack portion 15 and the axis Os of the guide shaft 6 are disposed to overlap each other in the vertical direction (Z direction). That is, a portion of the tooth portion of the rack portion 15 is positioned immediately above the axis Os.

A position detection unit 16 is provided on the second side wall portion 2c of the main body frame 2. The position detection unit 16 includes a detection case 16a which is fixed to the second side wall portion 2c, a stator portion which is fixed to the detection case 16a, and a rotor portion which rotates inside the detection case 16a. A rotor shaft 16b is fixed to the rotor portion. As shown in FIG. 4, the rotor shaft 16b is fitted to the pinion gear 14 and the rotor shaft 16b and the rotor portion rotate along with the pinion gear 14.

The position detection unit 16 is a magnetic detection type encoder, a rotation magnet is fixed to the rotor portion, a magnetic detection element such as a GMR element is provided in the stator portion, and a rotation angle between the rotor shaft 16b and the rotor portion is detected by the magnetic detection element. In addition, the position detection unit 16 may be a resistance change type encoder or an optical type encoder.

In the embodiment shown in FIG. 1, the position detection unit 16 is provided in a power transmission path from the output shaft of the motor 10 to a rack 3d. However, a linear detection type position detection unit may be provided between the movement member 5 and the main body frame 2.

Preferably, the position detection unit 16 can detect an absolute angle with reference to some rotation phases. Accordingly, when power with respect to the operation device 1 is turned off and thereafter, power is supplied to the operation device 1, at this time point, it is possible to ascertain at which position the movement member 5 stops in the forward-rearward direction.

Figure 5:
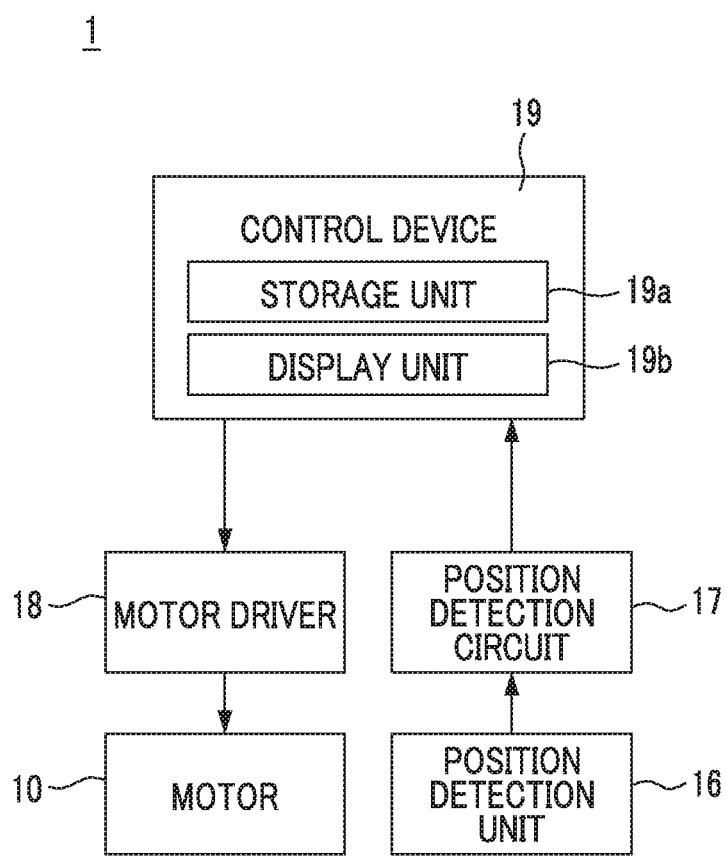
FIG. 5 is a block diagram showing a configuration of a control device which operates the operation device shown in FIG. 1.

As shown in FIG. 5, the operation device 1 includes a control device 19. The control device 19 controls a shooting game and is incorporated into a game machine main body, a personal computer, a general-purpose information processing device, or the like. The control device 19 is mainly configured of a Center Processing Unit (CPU), a storage unit 19a, or the like. When a shooting game is performed, game software is called up from the storage unit 19a, and a game processing operation is performed according to a predetermined program. In addition, the control device 19 includes a display unit 19b such as a color liquid crystal panel and a speaker.

A detection output detected by the position detection unit 16 is detected by a position detection circuit 17 and is provided to the control device 19. In addition, a control signal is provided from the control device 19 to a motor driver 18 and the motor 10 is controlled. The control signal which drives the motor driver 18 is incorporated into a portion of the game software.

Next, an operation of the operation device 1 will be described.

Figure 2:
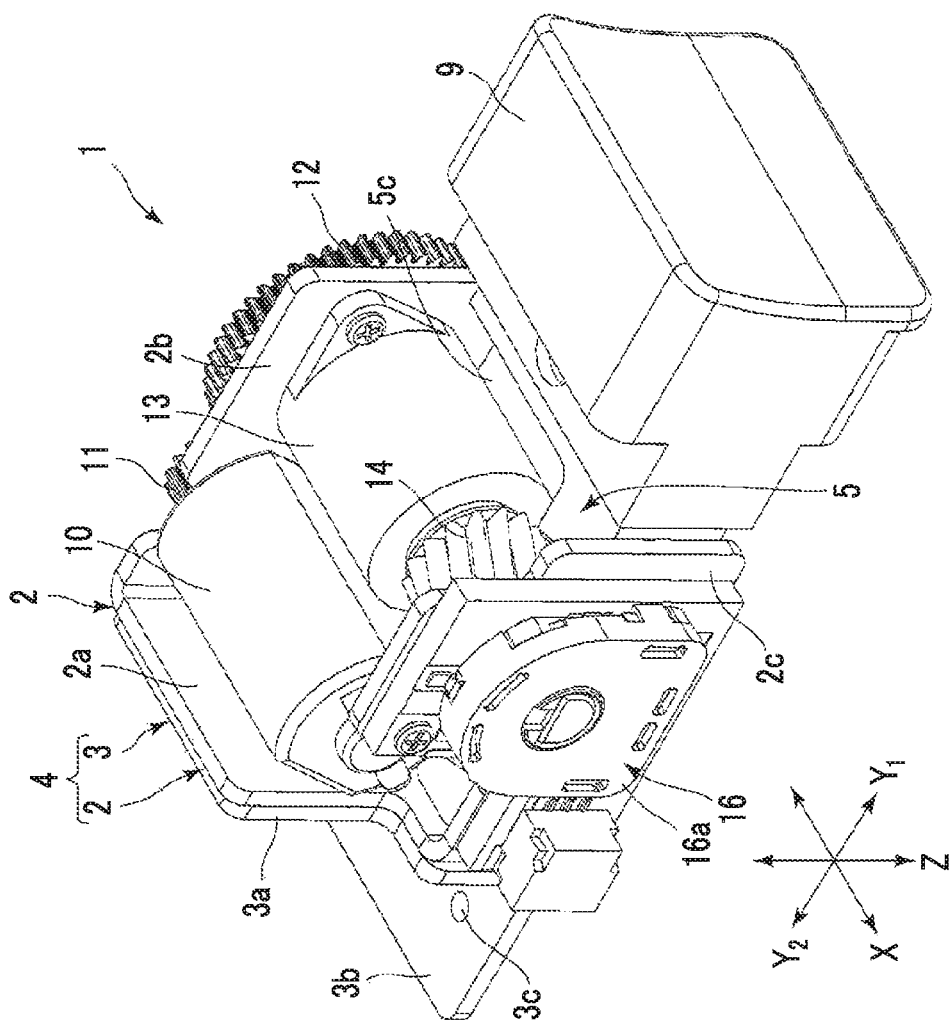
FIG. 2 is a perspective view showing the entire configuration of the operation device according to the first embodiment of the present invention and shows a state where the movement member and the operation portion move rearward.

The operation device 1 starts the motor 10 in which a control instruction is applied from the control device 19 to the motor driver 18, and can move the movement member 5 to an arbitrary position. For example, as shown in FIG. 1, the movement member 5 can be stopped at a position at which the movement member 5 moves forward in the Y1 direction and as shown in FIG. 2, the movement member 5 also can be stopped at a position at which the movement member 5 moves rearward in the Y2 direction. It is possible to set an initial position of the movement member 5 to which position according to a control flow which is performed by the control device 19.

For example, when the operation of the operation device 1 stops, as shown in FIG. 2, the movement member 5 moves rearward, and if power is supplied to the operation device 1, the motor 10 starts, the movement member 5 moves forward to the position shown in FIG. 1, and the position can be set to the initial position of the operation portion 9.

When the movement member 5 is set to the initial position shown in FIG. 1, if the operation portion 9 is pressed rearward (Y2 direction) by a finger or a hand, the rearward movement of the movement member 5 is detected by the position detection unit 16, and a rearward distance is calculated by the position detection circuit 17 and notified to the control device 19. When the movement member 5 moves rearward, in the control device 19, an instruction with respect to an operation reaction force is notified to the motor driver 18 and the motor 10 is operated. The control device 19 determines a kind of operation reaction force which is applied based on a flow which is processed at the time point at which the operation portion 9 is pressed and operated, and a drive pattern for applying an appropriate operation reaction force at this time point is provided to the motor driver 18.

When the movement member 5 is pressed by a finger or a hand according to the drive pattern, what extent in which the movement distance of the movement member 5 in the Y2 direction is permitted is determined based on the control flow at this time. For example, the movement member 5 moves rearward by only 5 mm, and the movement reaction force can be applied to the movement member 5 from the motor 10 such that the movement member 5 does not move rearward more than 5 mm. Alternatively, the movement member 5 moves rearward by only 10 mm, and the movement reaction force can be applied to the movement member 5 from the motor 10 such that the movement member 5 does not move rearward more than 10 mm. This is performed by applying a braking force to the rotor of the motor 10 when the movement member 5 moves to a predetermined position, or by applying a movement force in the Y1 direction for preventing the movement member 5 from moving in the Y1 direction.

Next, a voltage which is supplied to the motor 10 is controlled by the drive pattern, and it is possible to change a force required for pressing and moving the movement member 5 in the Y2 direction by changing drive torque of the motor 10. For example, the movement member 5 cannot move in the Y2 direction if the operation portion 9 is not pressed by a finger or a hand with a strong force or the movement member 5 can move rearward to a predetermined distance 5 mm or 10 mm by a relatively light force.

In addition, at any time point, power torque of the motor 10 may be zero. In a state where the power torque of the motor 10 is zero, when the operation portion 9 is pushed in by a finger or a hand, the finger or the hand pressing the operation portion 9 feels only the reaction forces by the speed reduction mechanism and the compression coil spring 8, and the movement member 5 moves to the terminal end in the Y2 direction.

In addition, if the power torque of the motor 10 is zero when the movement member 5 stops at any position, the movement member 5 is pressed in the Y1 direction by the elastic force of the compression coil spring 8, and the operation portion 9 may be set to the initial position shown in FIG. 1.

Alternatively, when the movement member 5 moves by a predetermined distance in the Y2 direction, it is possible to cause the finger or the hand pressing the operation portion 9 to feel vibrations by changing the torque of the motor 10. At this time, it is possible to change frequencies of vibrations felt by the finger or the hand or change amplitude of the movement by changing frequencies of a forward rotation and a rearward rotation of the motor 10 or a rotation angle of the motor 10.

In the operation device 1, the movement member 5 moves forward or rearward in the Y direction with reference to the axis Os of the guide shaft 6 by sliding between the guide shaft 6 fixed to the main body frame 2 which is a portion of the chassis 4 and the bearing portion 5c. Since the movement member 5 moves while sliding on the guide shaft 6, the forward and rearward movements of the movement member 5 are smoothly performed. If the bearing portions 5c of the movement member 5 are formed with an interval in the Y direction and the guide shaft 6 slides on the bearing portions 5c positioned front and rear, it is possible to decrease an amount of rattling in the direction in which the movement member 5 falls with respect to the Y axis, and the movement member 5 can move in the forward-rearward direction in a state of being stabilized.

As shown in FIG. 4, the rack portion 15 is disposed at a position at which the rack portion 15 overlaps the axis Os of the guide shaft 6 in the vertical direction (Z direction). The rotation force of the motor 10 acts on the rack portion 15 from the pinion gear 14 and a movement force or an operation resistance force are applied to the movement member 5. However, at this time, since the forces are applied in a direction parallel to the axis Os of the guide shaft 6 at the position close to the support portion by the guide shaft 6, unnecessary moment or rattling is not easily applied to the movement member 5 due to the power from the motor 10.

That is, the movement member 5 is supported along the axis Os and the guide center line Og disposed with an interval in the horizontal direction (X direction) and is supported so as to be movable in the forward-rearward direction. Meanwhile, the application line of the movement force applied from the motor 10 the movement member 5 is set to the position close to the portion immediately above the axis Os, and the application line of the movement force and the axis Os are set to be positioned at the same position in the horizontal direction (X direction). Accordingly, the moment that tries to fall the movement member 5 in the X direction by the movement force applied from the motor 10 hardly acts. Therefore, when the movement force is applied from the motor 10 to the movement member 5, it is possible to decrease a friction resistance of the sliding portion between the guide shaft 6 and the bearing portion 5c and the operation of the movement member 5 is smoothened.

In this way, in order to prevent excessive moment from acting on the movement member 5 by the force applied from the motor 10 to the movement member 5, preferably, a perpendicular distance from the engagement portion between the pinion gear 14 and the rack portion 15 to the axis Os is shorter than a horizontal distance from the axis Os to the guide center line Og, and more preferably, the perpendicular distance is ½ or less of the horizontal distance.

In addition, the tooth portion of each of the pinion gear 14 and the rack portion 15 is helical teeth. In the engagement between helical teeth, since a component of backlash in the Y direction is small, when the movement member 5 is pushed in the Y2 direction by the operation portion 9, a force is smoothly transmitted from the movement member 5 to the pinion gear 14. In addition, when the operation reaction force in the Y1 direction is applied to the movement member 5 and the operation portion 9 by the power of the motor 10, it is possible to obtain a feeling of a person's finger or hand on which the operation reaction force directly acts via the operation portion 9.

In the movement member 5, the left side shown in FIG. 4 is the thick portion 5a, the right side is the thin portion 5b, and the recessed portion 5c is formed above the thin portion 5b. In addition, the bearing portion 5c and the rack portion 15 are formed above and below in the thick portion 5a. Since the bearing portion 5c and the rack portion 15 are formed in the thick portion 5a, other portions can be thinned. As shown in FIG. 4, the gear box 13 and the motor 10 are disposed between the first side wall portion 2b and the second side wall portion 2c and face the recessed portion 5c, and the lower end portion of the gear box 13 and the lower end portion of the motor 10 are positioned below the rack portion 15 as shown to approach the bottom portion of the recessed portion 5c. According to this structure, it is possible to decrease a height dimension of the operation device 1 in the vertical direction (Z direction). In addition, since the gear box 13 and the motor 10 are disposed between the first side wall portion 2b and the second side wall portion 2c, it is possible to decrease a width dimension of the operation device 1 in the horizontal direction (X direction).

Next, in the control device 19, a control operation of the operation device 1 when a shooting game is performed will be described.

When the shooting game is performed, a game simulation program stored in the storage unit 19a of the control device 19 is read out, and this program is executed. If the game starts, a simulation image when a gun is fired is displayed on the display unit 19b.

Figure 6:
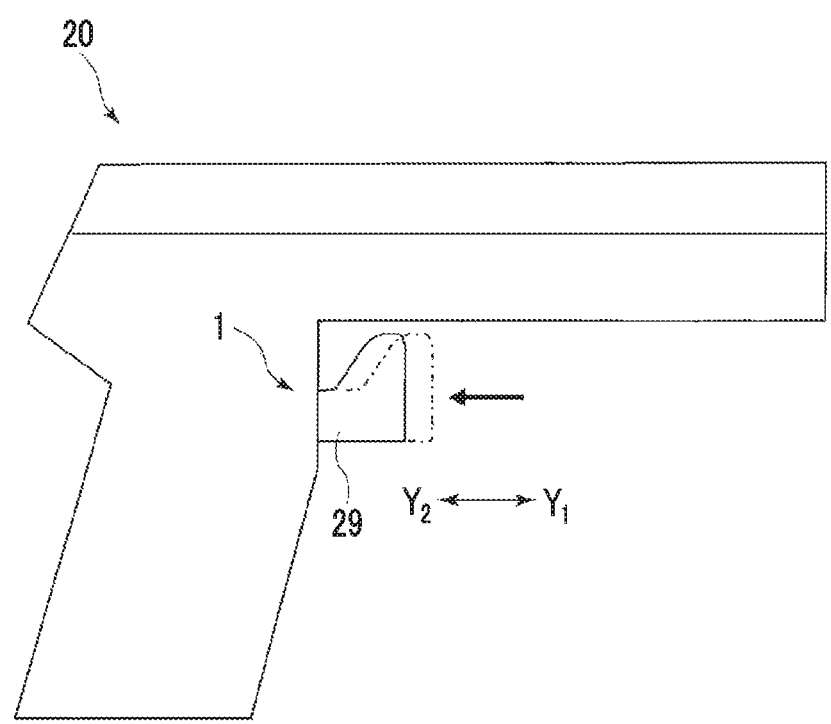
FIG. 6 is an explanatory view showing a schematic configuration when the operation device according to the embodiment of the present invention is applied to a gun-type controller for a shooting game.

For example, as a game controller when the shooting game is performed, a gun-type controller 20 shown in FIG. 6 is used. The operation device 1 is mounted on the gun-type controller 20, and instead of the operation portion 9 shown in FIGS. 1 to 3, an operation portion 29 having a shape simulating a trigger is fixed to the tip of the movement member 5.

If the game starts, the motor 10 starts, and the operation portion 29 moves forward to the initial position shown by chains line in FIG. 6. The forward positions at the initial position of the operation portion 29 are different from each other according to game contents which are processed at that time point.

If the operation portion 29 is pushed in the Y2 direction by a game operator' finger or hand, an image which is fired from a gun image is displayed on a simulation screen of the shooting game displayed by the display unit 19b, and a sound of the firing is emitted from a speaker. At this time, the motor 10 is controlled according to the game contents, and a reaction force, an impact force, or a vibration force is applied to a finger or a hand pressing the operation portion 29.

Since the forces do not act on the entire gun-type controller 20 and directly act on the operation portion 29 simulating a trigger, it is possible to provide an operation feeling having high reality to an operator.

In the shooting game, an initial menu screen is displayed on a setting screen, and it is possible to select a kind of gun which is used in the game. For example, it is possible to select a game which an operator wants to perform with a pistol, a machine gun, or the like. A movement pattern relating to an operation reaction force or the like corresponding to each gun is stored in the storage unit 19a, and if a movement pattern is selected and read out, the motor 10 is controlled based on the selected movement pattern. Accordingly, loads when the trigger is pressed, plays (amounts of movement), magnitudes of reaction, frequencies of reaction, and the like can be different from each other according to the kind of gun.

In the storage unit 19a, the kind of gun used in the game and the movement pattern driving the motor are associated with each other so as to be mapped. Accordingly, if the kind of gun used in the game is selected, the movement pattern corresponding to the kind of gun is called up from the storage unit 19a.

For example, in a case where the gun used in the game is a pistol (handgun), when the operation portion 29 is pushed in from the initial position, a small resistance force is applied from the motor 10 to the operation portion 29, and a firing operation starts if the operation portion 29 is pushed to a predetermined distance. At this time, the motor 10 is operated by one period of the forward rotation and the rearward rotation, the movement member 5 is vibrated forward and rearward once, and a force corresponding to the reaction at the time of firing is applied to the operation portion 29. In addition, at this time, the vibration may be performed during a plurality of periods at a predetermined frequency.

In a case where the gun used in the game is a machine gun, a slightly larger resistance force is applied to the operation portion 29 when the operation portion 29 is pushed in by the torque of the motor 10. Compared to the case of the pistol, since a slightly larger load is applied to the trigger, an operator can feel the weight of the machine gun. It is possible to directly provide a feeling of a game operation having high reality to a finger by changing the reaction force acting on the movement member 5 according to the kind of gun. If the operation portion 9 is pushed in to a firing position, the motor 10 is operated so as to repeat the forward rotation and the rearward rotation and provides vibrations to a finger pulling the trigger. The vibrations coincide with the frequencies when bullets are fired from the machine gun, the movement member 5 is vibrated forward and rearward with slightly larger amplitude, and reaction forces corresponding to continuous firing act on the operation portion 9.

It is possible to provide an operation and a reaction corresponding to the size of the machine gun or the like by changing the frequencies and periods of the vibrations applied to the movement member 5 when the operation portion 9 is pushed in and the torque of the motor 10 during the vibrations, according to the kind of the machine gun in the game.

Bullet information indicating the number of bullets loaded into a gun is included in the game software. The bullet information is also displayed on the display unit 19b.

It is possible to change the operation reaction force which is applied to the operation portion 29 using the bullet information. For example, it is possible to control the position of the movement member 5 such that a protrusion position of the operation portion 29 is changed according to a decrease in the number of available bullets. In addition, when the number of available bullets is zero (out of ammo), the power supplied to the motor 10 may be zero instantly and the reaction force in the Y1 direction acting on the movement member 5 may not be exist so as to rapidly decrease the load of the trigger during the operation. In this case, when a bullet is newly supplemented, the motor 10 starts, the movement member 5 moves in the Y1 direction, and the position of the operation portion 9 can be returned to the initial position shown by the chain lines in FIG. 6.

Figure 7A:
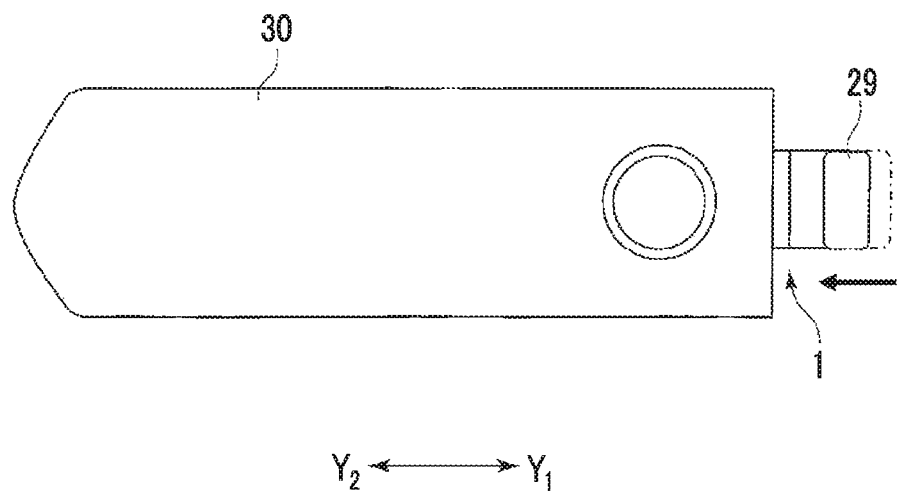
FIGS. 7A and 7B are explanatory views showing a schematic configuration of a game controller on which an operation device according to a second embodiment of the present invention is mounted.
Figure 7B:
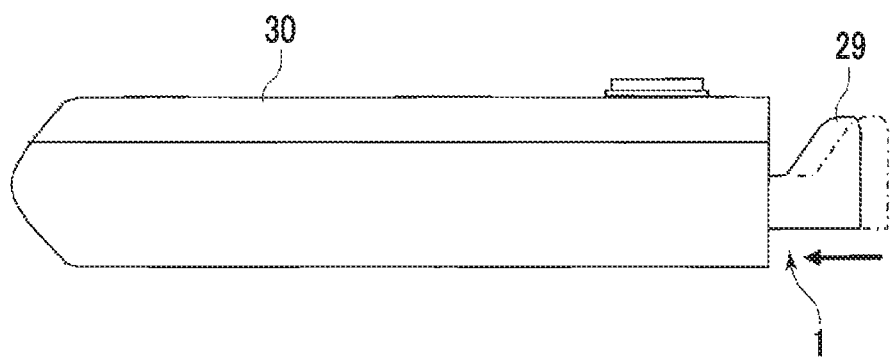

In addition, the controller used in the shooting game is not limited to the gun-type controller 20 shown in FIG. 6, and may be a stick-type controller 30 shown in FIGS. 7A and 7B. The stick-type controller 30 is held by a hand, a finger is applied to the operation portion 29 so as to press the operation portion 29 in the Y2 direction, and it is possible to operate a shooting game in the same manner as described above.

In the above-described embodiment, when the shooting game is performed by the game device or the control device 19 of a personal computer or a general-purpose information processing device, the driving of the motor 10 is controlled by a feedback control from the control device 19. However, the control device is provided inside the controllers 20 and 30 shown in FIG. 6 or 7, and the motor 10 may be driven by the control operation from the control device.

In addition, games other than the shooting game may be operated by the controller having the operation device 1. For example, in a car driving game, it is possible to operate an accelerator or a brake by pushing the operation portions 9 and 29. In this case, it is possible to generate a reaction force corresponding to the pushed-in position of the operating portion 9 by the motor 10.

Figure 8:
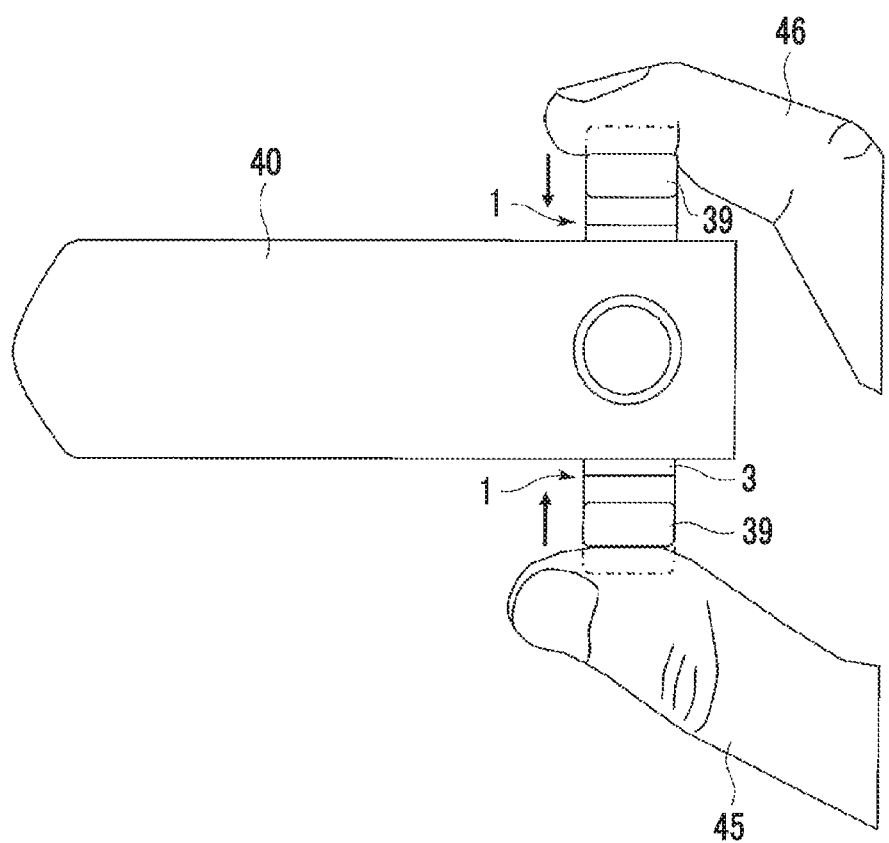
FIG. 8 is an explanatory view showing a use example of an operation device according to a third embodiment of the present invention.
Figure 9:
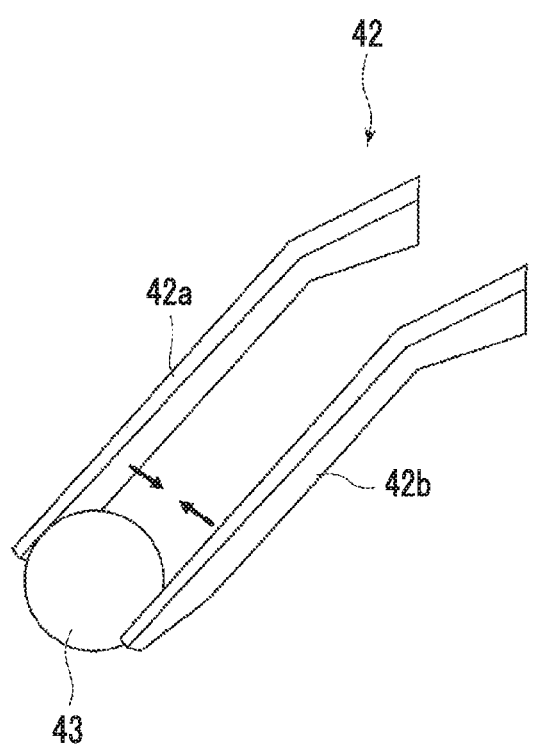
FIG. 9 is an explanatory view of a manipulator which is operated using the operation device shown in FIG. 8.

In an embodiment shown in FIG. 8, two operation devices 1 are provided in a controller 40, and two operation portions 39 and 39 can be individually operated.

For example, as shown in FIG. 10, in the controller 40, it is possible to perform simulation which operates a manipulator 42 displayed on the display unit 19b. For example, it is possible to hold an object 43 by two arms 42a and 42b of the manipulator 42 displayed on the screen by individually operating the operation portions 39 and 39 using two fingers 45 and 46.

In this case, reaction forces are applied from the motor 10 to the fingers 45 and 46 according to the pushed-in positions of the two operation portions 39 and 39, and it is possible to provide an operation feeling similar to that when the object 43 is held by the arms 42a and 42b.

In addition, the manipulator 42 is not limited to the simulation displayed on the screen and it is possible to operate a manipulator, which can be actually operated by a machine operation, by the controller 40.

In addition, if five operation devices 1 are provided in the controller, it is possible to operate the operation portions 39 by five fingers of a hand. In this case, it is possible to provide a feeling of holding an object by five fingers to an operator. In this way, the application range of the operation device 1 according to the present embodiment is very wide and the operation device 1 can be applied in addition to the manipulator.

It should be understood by those skilled in the art that various modifications, combinations, sub-combinations and alterations may occur depending on design requirements and other factors insofar as they are within the scope of the appended claims of the equivalents thereof.

What is claimed is:

1. An operation device comprising:
   a chassis including:
      a guide shaft extending in a first direction; and
      a sliding guide portion extending in the first direction;
   a moving member movably supported by the chassis and configured to reciprocate in the first direction, the moving member including:
      a bearing portion which receives the guide shaft therein; and
      a sliding portion which slides along the sliding guide portion;
   an operation portion configured to apply a movement force to the moving member;
   a motor configured to provide a reaction force to the moving member;
   a position detection unit configured to detect a position of the moving member and output a detection signal; and
   a control device configured to control an output of the motor according to the detection signal, thereby providing a variety of operation feels.

2. The operation device according to claim 1, further comprising:
   a pinion gear configured to be rotationally driven by the motor; and
   a rack portion formed on the moving member, the rack portion being configured to engage with the pinion gear,
   wherein an axis of the guide shaft and a guide center line of the sliding guide portion are apart from each other in a horizontal direction, and the rack portion is disposed along the axis of the guide shaft viewed from a vertical direction.

3. The operation device according to claim 2,
   wherein the moving member includes a thick portion and a thin portion such that a recess is formed on a side of the thick portion, and the bearing portion and the rack portion are formed in the thick portion.

4. The operation device according to claim 3, further comprising:
   a speed reduction mechanism configured to transmit power from the motor to the pinion gear, the speed reduction mechanism facing the recess of the moving member.

5. The operation device according to claim 4,
   wherein the pinion gear and the rack portion have helical teeth.

6. The operation device according to claim 3,
   wherein the motor is provided at a position facing the recess of the moving member.

7. The operation device according to claim 2, wherein an application line of the movement force and an application line of the reaction force are substantially aligned in the horizontal direction, thereby decreasing a moment applied to the moving member.

8. The operation device according to claim 1,
   wherein the chassis is formed of a metal plate including:
      a facing wall portion facing a movement direction of the moving member; and
      a side wall portion bent from the facing wall portion and extending in the movement direction of the moving member,
   and wherein the guide shaft is perpendicularly fixed to the facing wall portion, and the sliding guide portion is provided in the side wall portion.

* * * * *